Dec. 30, 1958 T. I. DUFFY 2,866,657
STEERING CONSTRUCTION FOR BICYCLES AND THE LIKE
Filed Jan. 14, 1957
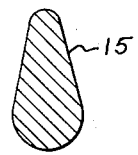
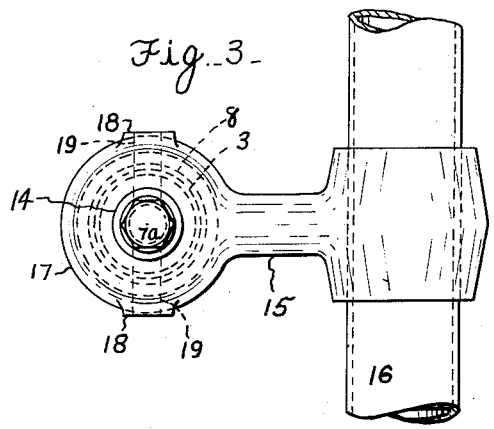
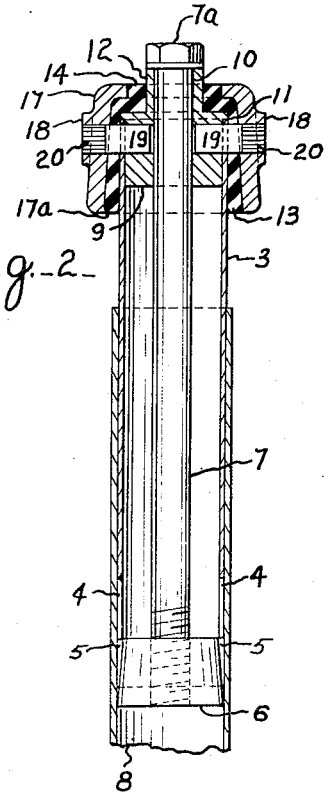
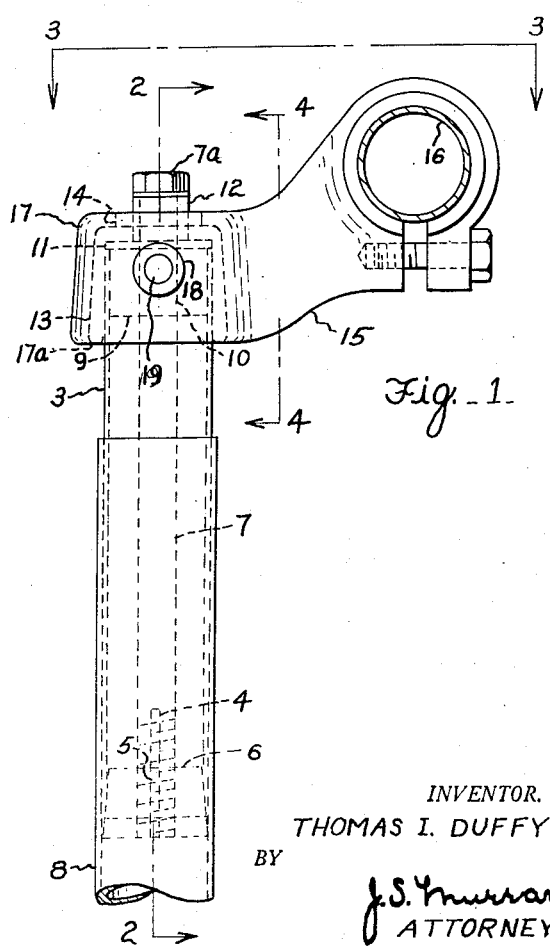
INVENTOR.
THOMAS I. DUFFY
BY
J. S. Murray
ATTORNEY

United States Patent Office 2,866,657
Patented Dec. 30, 1958

2,866,657
STEERING CONSTRUCTION FOR BICYCLES AND THE LIKE

Thomas I. Duffy, Spring Lake, Mich., assignor to Ethel M. Benedict, Detroit, Mich.

Application January 14, 1957, Serial No. 633,980

3 Claims. (Cl. 287—54)

This invention relates to steering control constructions for foot-propelled vehicles, and more particularly to vibration absorbing provisions for such constructions.

An object of the invention is to interpose a resiliently compressible member between the engaging portions of an assembled handle-bar bracket and steering post, so as to leave no contact between such portions, whereby said compressible member may absorb much of the vibration transmitted in present practice from the steering post through the handle bar bracket to the handle bars.

A further object is to provide conforming apertures in said compressible member and said bracket to accommodate a bolt to be inserted in the steering post coaxially with the latter to affix the mechanism operatively to a vehicle.

A further object is to so arrange the described parts that no compression of said compressible member results from the axially directed force applied by said bolt to the steering post.

These and various other objects are attained by the invention described herein and illustrated in the accompanying drawing, wherein:

Fig. 1 is a side elevational view of the improvement alone, omitting the bicycle frame.

Fig. 2 is a sectional elevation on the line 2—2 of Fig. 1.

Fig. 3 is a top plan view of the device, taken on the line 3—3 of Fig. 1.

Fig. 4 is a vertical cross-section on the line 4—4 of Fig. 1.

In these views, the frame and tubular steering head of a bicycle are omitted to disclose a tubular steering post 3 having its lower end longitudinally slotted as at 4. Said slots receive the keys 5 on a tapered expander 6, which, when drawn upwardly by the elongated bolt 7, circumferentially distends the lower end of said steering post into frictional engagement with the inner surface of the stem 8 of a wheel fork (not shown).

Tightly fitted into the upper end of the steering post 3 is a plug 9 having a hole 10 co-axial with said post. An annular shoulder 11 limits penetration of said plug into said post, and an extension 12 of reduced diameter projects upwardly from said shoulder. A closely fitting cap 13, preferably of rubber or a similar resiliently compressible material, encases the upper end of said steering post and has an annular collar 14 embracing the aforesaid extension.

A bracket 15, forwardly mounting handle bars 16, is rearwardly formed with a downwardly opening socket member 17, the socket 17a of which snugly receives the cap-encased upper portion of said steering post and is apertured to receive said collar 14.

Through diametrically opposed bosses 18, a pair of aligned pins 19 are driven through the cap 13 and into the plug 9 to transmit steering torque and afford the bracket 15 a slight pivotal play. The outer ends of said pins may be secured in said bosses as by serrations 20.

The desirability of the improved device over prior shock absorbent steering constructions is apparent in the inverted socket construction 17 of the bracket 15, adapting the device for use with a conformingly shaped resiliently compressible cap. This averts any contact between the bracket and the steering post, even the projecting extension 12 being cushioned by the collar 14. The head 7a of the bolt 7, it is readily noted, seats on the end surface of the plug-extension 12, so that in attaching the construction to a vehicle, any necessary pressure may be applied to the post 3 longitudinally thereof without compressing the cap 13 and thereby detracting from its vibration absorbing qualities.

What I claim is:

1. A vibration-absorbing steering construction for foot-propelled vehicles, comprising a tubular steering post, a handle bar bracket formed with a socket to receive the upper end portion of the steering post, a cap formed of resiliently compressible material encasing said end portion within said socket and completely insulating the bracket from the post, a pair of aligned pins interconnecting the bracket, post and cap, to transmit steering torque to the post from said bracket, and to afford the bracket a slight pivotal movement about the axis of said pins and transverse to the axis of said steering post, and attaching means to operatively apply the construction to a vehicle while leaving the cap free of compression.

2. A vibration-absorbing steering construction as set forth in claim 1, said attaching means including a cylindrical plug inserted in the upper end of the steering post and having an annular shoulder to limit such insertion, and having an extension projecting upwardly from said shoulder through holes in said cap and handle bar bracket, and engaging the periphery of the hole in said cap, and further including a headed bolt passing through said plug coaxially with the steering post, to apply pressure axially of the latter, thus attaching said construction to a vehicle while leaving said cap free of compression.

3. In a vibration-absorbing steering construction as set forth in claim 2, an annular collar formed on the cap peripherally of the hole therein and embracing the extension to insulate said extension from contact with the periphery of the hole in said handle bar bracket.

References Cited in the file of this patent

UNITED STATES PATENTS

| | | |
|---|---|---|
| 600,046 | Sparks | Mar. 1, 1898 |
| 1,379,784 | Schwartz | May 31, 1921 |
| 1,876,709 | MacPherson | Sept. 13, 1932 |
| 2,642,252 | Pietz | June 16, 1953 |
| 2,725,692 | Andreae | Dec. 6, 1955 |